United States Patent
Lin

(10) Patent No.: US 11,228,390 B2
(45) Date of Patent: Jan. 18, 2022

(54) METHOD FOR TRANSMITTING DATA, RECEIVING-END DEVICE, AND TRANSMITTING-END DEVICE

(71) Applicant: GUANGDONG OPPO MOBILE TELECOMMUNICATIONS CORP., LTD., Guangdong (CN)

(72) Inventor: YaNan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/331,367

(22) PCT Filed: Oct. 12, 2016

(86) PCT No.: PCT/CN2016/101942
§ 371 (c)(1),
(2) Date: Mar. 7, 2019

(87) PCT Pub. No.: WO2018/068241
PCT Pub. Date: Apr. 19, 2018

(65) Prior Publication Data
US 2019/0199469 A1    Jun. 27, 2019

(51) Int. Cl.
*H04L 1/00*     (2006.01)
*H04L 27/38*    (2006.01)
*H04W 8/24*     (2009.01)

(52) U.S. Cl.
CPC ............ *H04L 1/0003* (2013.01); *H04L 1/00* (2013.01); *H04L 1/007* (2013.01); *H04L 1/0018* (2013.01);
(Continued)

(58) Field of Classification Search
None
See application file for complete search history.

(56) References Cited

U.S. PATENT DOCUMENTS

| 5,214,656 A | 5/1993 | Chung |
| 6,975,650 B2 | 12/2005 | Terry |

(Continued)

FOREIGN PATENT DOCUMENTS

| CN | 1522944 A | 8/2004 |
| CN | 1529944 A | 9/2004 |

(Continued)

OTHER PUBLICATIONS

First Office Action of the Russian application No. 2019110397, dated Nov. 14, 2019.

(Continued)

*Primary Examiner* — Rebecca E Song

(57) ABSTRACT

Provided in an embodiment of the invention are a method for transmitting data, a receiving-end device, and a transmitting-end device. The method comprises: a receiving-end device receiving, on a time unit, a first part and at least one second part of data, wherein first modulation and coding processing is performed on the first part, and second modulation and coding processing is performed on the at least one second part; and the receiving-end device performing demodulation on the first part and the at least one second part. The method for transmitting data, the receiving-end device, and the transmitting-end device provided in the embodiment of the invention achieve a higher frequency spectrum efficiency, thereby realizing fast demodulation.

14 Claims, 4 Drawing Sheets

200

A receiver device receives a first part and at least one second part of data on a time unit, first modulation and coding processing being adopted for the first part and second modulation and coding processing being adopted for the at least one second part  — S210

The receiver device demodulates the first part and the at least one second part — S220

(52) U.S. Cl.
CPC .......... *H04L 1/0025* (2013.01); *H04L 1/0043* (2013.01); *H04L 1/0052* (2013.01); *H04L 1/0071* (2013.01); *H04L 1/0075* (2013.01); *H04L 1/0086* (2013.01); *H04L 27/38* (2013.01); *H04W 8/24* (2013.01); *H04L 1/0057* (2013.01); *H04L 1/0059* (2013.01)

(56) References Cited

U.S. PATENT DOCUMENTS

| | | | |
|---|---|---|---|
| 8,867,469 | B2 | 10/2014 | Han |
| 9,088,979 | B2 | 7/2015 | Baldemair et al. |
| 9,136,975 | B2 | 9/2015 | Jeong |
| 9,166,742 | B2 | 10/2015 | Ouchi |
| 9,225,399 | B2 | 12/2015 | Shan |
| 9,253,698 | B2 | 2/2016 | Zhang et al. |
| 9,277,471 | B2 | 3/2016 | He et al. |
| 9,332,469 | B2 | 5/2016 | Davydov |
| 9,363,727 | B2 | 6/2016 | Chou |
| 9,420,511 | B2 | 8/2016 | Gupta Hyde et al. |
| 9,572,077 | B2 | 2/2017 | Zhang et al. |
| 9,585,075 | B2 | 2/2017 | Khoryaev et al. |
| 9,609,564 | B2 | 3/2017 | Davydov et al. |
| 2003/0152062 | A1 | 8/2003 | Terry |
| 2004/0174856 | A1 | 9/2004 | Brouet |
| 2005/0245198 | A1 | 11/2005 | Brignol |
| 2009/0199066 | A1* | 8/2009 | Kim ............... H04L 1/0061 714/752 |
| 2011/0185249 | A1 | 7/2011 | Jongren |
| 2012/0204081 | A1* | 8/2012 | Fresia ............ H03M 13/296 714/763 |
| 2013/0235865 | A1 | 9/2013 | Eum et al. |
| 2014/0078921 | A1 | 3/2014 | Jeong |
| 2014/0136922 | A1 | 5/2014 | Oketani |
| 2014/0269383 | A1 | 9/2014 | He |
| 2014/0269779 | A1 | 9/2014 | Shan |
| 2014/0286215 | A1 | 9/2014 | Koc |
| 2014/0286302 | A1 | 9/2014 | Khoryaev |
| 2015/0029874 | A1 | 1/2015 | Davydov |
| 2015/0171939 | A1 | 6/2015 | Davydov et al. |
| 2015/0230179 | A1 | 8/2015 | Gupta |
| 2015/0230234 | A1 | 8/2015 | Choi |
| 2015/0245221 | A1 | 8/2015 | Heo |
| 2015/0249947 | A1 | 9/2015 | Zhang |
| 2015/0263825 | A1* | 9/2015 | Kim ............... H04L 1/0013 375/260 |
| 2015/0289237 | A1* | 10/2015 | Kim ............... H04L 5/0094 370/329 |
| 2016/0119842 | A1 | 4/2016 | Zhang et al. |
| 2016/0157241 | A1 | 6/2016 | He et al. |
| 2016/0173130 | A1* | 6/2016 | Krysl ............. H04L 1/0057 714/776 |
| 2016/0183281 | A1 | 6/2016 | Yeh et al. |
| 2017/0126378 | A1* | 5/2017 | Luo ............... H04W 28/065 |
| 2017/0141903 | A1* | 5/2017 | Xu ................ H04L 1/0026 |
| 2018/0083736 | A1* | 3/2018 | Manolakos ....... H03M 13/2789 |
| 2018/0278365 | A1* | 9/2018 | Liu ............... H04L 1/0026 |
| 2019/0123849 | A1* | 4/2019 | Baldemair ........ H04L 1/0023 |
| 2019/0312675 | A1* | 10/2019 | Yokomakura ...... H03M 13/09 |

FOREIGN PATENT DOCUMENTS

| | | |
|---|---|---|
| CN | 2696247 Y | 4/2005 |
| CN | 1909538 A | 2/2007 |
| CN | 102055558 A | 5/2011 |
| CN | 102647251 A | 8/2012 |
| CN | 102792372 A | 11/2012 |
| CN | 103685115 A | 3/2014 |
| CN | 104782166 A | 7/2015 |
| CN | 108123778 A | 6/2018 |
| EA | 010465 B1 | 8/2008 |
| JP | 2005072878 A | 3/2005 |
| JP | 2007043550 A | 2/2007 |
| JP | 2012090273 A | 5/2012 |
| KR | 20100074324 A | 7/2010 |
| KR | 20140048055 A | 4/2014 |
| KR | 20140060660 A | 5/2014 |
| RU | 2434365 C2 | 11/2011 |
| RU | 2497286 C2 | 10/2013 |
| RU | 2524392 C2 | 7/2014 |
| RU | 2597001 C2 | 9/2016 |
| WO | 2010073670 A1 | 7/2010 |
| WO | 2011039821 A1 | 4/2011 |
| WO | 2011093074 A1 | 8/2011 |
| WO | 2015053698 A1 | 4/2015 |
| WO | 2016073570 A1 | 5/2016 |

OTHER PUBLICATIONS

Setfania Sesia et al: "LTE", LTE—the UMTS long term evolution : from theory to practice ; [Including release 10 for LTE-advanced], Jan. 1, 2011 (Jan. 1, 2011). XP055389995, Chichester ISBN: 978-0-470-66025-6 Retrieved from the Internet:URL:http://www.cs.odu.edu/ rnagella/LTE-simulation/Wiley. LTE. The. UMTS. Long. Term. Evolution.From.Theory.to.Practice.2nd.Edition.0470660252.pdf [retrieved on Jul. 12, 2017] * Section 16.4; p. 365-p. 366 * * 16.15 *.
Supplementary European Search Report in the European application No. 16918613.7, dated Aug. 9, 2019.
International Search Report in international application No. PCT/CN2016/101942, dated Jun. 28, 2017.
Written Opinion of the International Search Authority in international application No. PCT/CN2016/101942, dated Jun. 28, 2017.
First Office Action of the Chinese application No. 201680088972.8, dated Mar. 5, 2020.
First Office Action of the Canada application No. 3036576, dated Mar. 13, 2020.
Second Office Action of the Russian application No. 2019110397, dated Apr. 13, 2020.
Nokia, Alcatel-Lucent Shanghai Bell. "HARQ operation for large transport block sizes", 3GPP TSG-RAN WG1 #86-BIS R1-1609744, published on Oct. 1, 2016.
Huawei. EUTRA downlink concept: Text proposal for Section 7 in TR "Physical Layer Aspect for Evolved UTRA", 3GPP TSG RAN WG1 Ad Hoc R1-050632, Jun. 1, 2005, entire document.
First Office Action of the Japanese application No. 2019-513411, dated Aug. 25, 2020.
First Office Action of the Brazilian application No. 1120190067701, dated Sep. 1, 2020.
Notice of Allowance of the Chinese application No. 201680088972.8, dated Jun. 24, 2020.
First Office Action of the Chilean application No. 201900870, dated Feb. 19, 2020.
Written Opinion dated Jun. 28, 2017; PCT/CN2016/101942.
First Office Action of the Israeli application No. 265228, dated Oct. 29, 2020.
First Office Action of the Taiwanese application No. 106130403, dated Dec. 21, 2020.
Second Office Action of the Chilean application No. 201900870, dated Oct. 20, 2020.
Second Office Action of the Canadian application No. 3036576, dated Dec. 7, 2020.
Notice of Allowance of the Taiwanese application No. 106130403, dated May 17, 2021.
Office Action of the Indian application No. 201917014101, dated Mar. 23, 2021.
First Office Action of the European application No. 16918613.7, dated Jun. 10, 2021.
First Office Action of the Indonesian application No. P00201903712, dated Jul. 26, 2021.
3GPP TSG-RAN Working Group 1 #50 Tdoc R1-073671, Athens, Aug. 20-24, 2007, Source: Nokia Siemens Networks, Nokia, Title: Physical Channel Segmentation, Agenda Item: 7.3 Finalization of TS 36.212, Document for Discussion and Decision.
3GPP TSG RAN WG1 #86 R1-167901, Gothenburg, Sweden, Aug. 22-26, 2016, Source: ZTE, Title Consideration on channel coding for NR, Agenda item: 8.1.4.1, Document for: Discussion.

(56) References Cited

OTHER PUBLICATIONS

First Office Action of the Chinese application No. 202010935196.9, dated Sep. 28, 2021.
First Office Action of the Australian application No. 2016426021, dated Dec. 6, 2021.

* cited by examiner

200

A receiver device receives a first part and at least one second part of data on a time unit, first modulation and coding processing being adopted for the first part and second modulation and coding processing being adopted for the at least one second part — S210

The receiver device demodulates the first part and the at least one second part — S220

METHOD FOR TRANSMITTING DATA, RECEIVING-END DEVICE, AND TRANSMITTING-END DEVICE

TECHNICAL FIELD

The disclosure relates to the field of communication, and more particularly, to a method for data transmission, a receiver device and a sender device.

BACKGROUND

In a conventional Long Term Evolution (LTE) system, a Transport Block (TB) adopts the same coding manner and the same modulation and coding level and is mapped to a Physical Resource Block (PRB) in a subframe after interleaving processing. A receiver may start demodulation only after completely receiving all time-domain symbols in the subframe. Since a certain time is required by processing of demodulation, decoding and the like, feedback information is required to be transmitted in a subsequent subframe. A processing time domain in LTE is 4 ms.

There may be more service types in a 5th-Generation (5G) system, for example, Ultra Reliable and Low Latency Communication (URLLC). Services of this type require a receiver to give a feedback rapidly and require, under an extreme condition, feedback information corresponding to data in a present time unit to be fed back in the present time unit. However, in a conventional art, demodulation may be implemented after a certain time, which is relatively low in spectrum efficiency and may not meet the requirements of the services of this type. Therefore, it is urgent to propose a solution to solve the problem.

SUMMARY

Embodiments of the disclosure provide a method for data transmission, a receiver device and a sender device, which may improve spectrum efficiency, thereby implementing rapid demodulation.

A first aspect provides a method for data transmission, which may include the following operations.

A receiver device receives a first part and at least one second part of data on a time unit, first modulation and coding processing being adopted for the first part and second modulation and coding processing being adopted for the at least one second part.

The receiver device demodulates the first part and the at least one second part.

In the embodiments of the disclosure, the receiver device receives the first part and at least one second part of the data on the time unit, the first modulation and coding processing being adopted for the first part and the second modulation and coding processing being adopted for the at least one second part, and the first part and the at least one second part are demodulated, so that spectrum efficiency may be improved and rapid demodulation is further implemented.

Alternatively, the time unit may be understood as a time unit occupied by a TB and the TB is divided into a first part (or called a first code block part, the first code block part mentioned hereinafter is the first part) and at least one second part (or called a second code block part, the second code block part mentioned hereinafter is the second part) for data transmission. For example, the time unit may be a basic unit of a time-domain physical resource configured for signal transmission and may specifically be a subframe, a Transmission Time Interval (TTI), a time slot, an Orthogonal Frequency Division Multiplexing (OFDM) symbol, a Resource Element (RE) or the like. There are no limits made thereto.

Alternatively, the receiver device may be a terminal device or a network device. Descriptions will be made herein with the terminal device as an example.

In the embodiments of the disclosure, the at least one second part may be one or more code block parts (i.e., second code block parts) and there are no limits made to the number of the code block parts.

In some possible implementation modes, the time unit occupies N time-domain symbols, the first code block part occupies the first L time-domain symbols of the N time-domain symbols and the at least one second code block part occupies the last K time-domain symbols in the N time-domain symbols, N being a positive integer greater than 1, L being a positive integer not greater than N and K being a positive integer not greater than N.

Alternatively, in the embodiments of the disclosure, the terminal device divides the TB into the first code block part and the at least one second code block part. The first code block part is configured to be subjected to the first modulation and coding processing and the at least one second code block part is configured to be subjected to the second modulation and coding processing. The TB occupies the N time-domain symbols, the first code block part occupies the first L time-domain symbols of the N time-domain symbols and the at least one second code block part occupies the last K time-domain symbols in the N time-domain symbols. Transmitting the first code block part and the at least one second code block part on the N time-domain symbols may improve spectrum efficiency, thereby implementing rapid demodulation.

Alternatively, as an embodiment, a sum of the L time-domain symbols occupied by the first part and the K time-domain symbols occupied by the at least one second part is the N time-domain symbols occupied by the time unit.

Or, the sum of the L time-domain symbols occupied by the first part and the K time-domain symbols occupied by the at least one second part is a sum of the N time-domain symbols occupied by the time unit and a time-domain symbol, the last time-domain symbol in the L time-domain symbols and the first time-domain symbol in the K time-domain symbols being the same time-domain symbol.

For example, during specific implementation, the sum of L and K may be N or the sum of L and K may also be N+1.

Alternatively, the first code block part and the at least one second code block part are independently coded.

In the embodiments of the disclosure, a processing manner of complex coding, interleaving and the like may be adopted for the first code block part and demodulation performance of the first code block part is higher than that of the at least one second code block part.

In some possible implementation modes, the first modulation and coding processing is different from the second modulation and coding processing in terms of at least one of coding manner, modulation manner, or coding rate.

In some possible implementation modes, a modulation level adopted for the second modulation and coding processing is not higher than a modulation level adopted for the first modulation and coding processing; and/or a coding rate adopted for the second modulation and coding processing is not higher than a coding rate adopted for the first modulation and coding processing.

Herein, since relatively complex coding and interleaving manners are adopted for the first code block part and simple coding processing is adopted for the second code block part, for ensuring similar demodulation performance of the second code block part and the first code block part, the coding rate and/or modulation and coding level of the second code block part may be appropriately reduced.

Alternatively, in the embodiments of the disclosure, interleaving processing may be performed on the first code block part after channel coding and includes interleaving manners of inter-code-block interleaving, time-domain interleaving and the like; and interleaving processing is not performed on the at least one second code block part after channel coding.

Alternatively, interleaving processing may be performed on the first part of the data before the first part is coded; and/or interleaving processing may also be performed on the first part of the data after the first part is coded. There are no limits made thereto.

Alternatively, a resource mapping manner for the at least one second code block part may be a manner of a frequency domain at first and then a time domain.

Alternatively, the first code block part may include multiple code sub-blocks. Specifically, the first code block part may further be divided into the multiple code sub-blocks and the multiple code sub-blocks are independently coded. Therefore, a terminal device may adopt a parallel decoder to implement rapid decoding.

In some possible implementation modes, the receiver device is the terminal device and the method may further include the following operations.

The terminal device receives first signaling sent by a network device, the first signaling being configured to indicate a modulation and coding level corresponding to the first modulation and coding processing.

The terminal device determines a modulation and coding level corresponding to the second modulation and coding processing according to the first signaling; or, the terminal device determines at least one of a modulation manner or coding rate corresponding to the second modulation and coding processing according to the first signaling.

Herein, the terminal device may receive the first signaling sent by the network device, thereby determining the modulation and coding level adopted for the at least one second code block part.

Alternatively, in the embodiments of the disclosure, the first signaling may be configuration signaling transmitted to the terminal device by the network device.

In some possible implementation modes, the receiver device is the terminal device and the method may further include the following operations.

The terminal device receives second signaling sent by the network device, the second signaling being configured to indicate at least one of a value of K or a total number of the at least one second part.

Alternatively, in the embodiments of the disclosure, the second signaling may directly indicate the value of K and may also indirectly indicate the value of K. For example, alternatively, the second signaling may also be configured to indicate the number of REs occupied by the at least one second code block part or configured to indicate a ratio of the number of the REs occupied by the at least one second code block part to the total number of REs. The terminal device may indirectly acquire the value of K according to information about the number of the REs.

Alternatively, in the embodiments of the disclosure, the second signaling may be configuration signaling, for example, Downlink Control Information (DCI) signaling, transmitted to the terminal device by the network device.

In the embodiments of the disclosure, the value of K may be configured by the network device or specified by a protocol. There are no limits made thereto.

In some possible implementation modes, the first part occupies a first frequency-domain resource for transmission and the at least one second part occupies a second frequency-domain resource for transmission, the first frequency-domain resource being different from the second frequency-domain resource. Specifically, the first code block part is mapped to the first frequency-domain resource in the L time-domain symbols and the at least one second code block part is mapped to the second frequency-domain resource in the K time-domain symbols, the first frequency-domain resource being different from the second frequency-domain resource.

Alternatively, in the embodiments of the disclosure, a Transport Block Size (TBS) of each second code block part in the at least one second code block part is not greater than a first threshold value.

Alternatively, the first threshold value may be configured by the network device or may also be specified by the protocol.

Herein, the first threshold value is introduced to specific a IBS upper limit of the second code block part to ensure rapid demodulation of the second code block part.

In some possible implementation modes, the method 200 further includes the following operation.

If a size of a target code block of the at least one second part is greater than a second threshold value, the receiver device divides the target code block into multiple code sub-blocks, a size of each of the multiple code sub-blocks being not greater than the second threshold value and each of the multiple code sub-blocks being independently coded.

In other words, if a TBS of a second code block part in the at least one second code block part is greater than the second threshold value, the second code block part is divided into multiple code sub-blocks, a TBS of each of the multiple code sub-blocks being not greater than the second threshold value.

Alternatively, the second threshold value may be configured by the network device or may also be specified by the protocol.

The terminal device divides the second code block part into the multiple code sub-blocks and adopts the parallel decoder for decoding, so that rapid decoding is implemented.

Alternatively, the first code block part may also be divided into multiple code sub-blocks, also for implementing rapid decoding.

In some possible implementation modes, the method may further include the following operation.

Capability information is sent to the network device, the capability information being configured to indicate that the terminal device supports the data (the corresponding TB) transmitted on the time unit to be divided into the first part and the at least one second part for transmission.

In such a manner, the network device may learn about the capability information of the terminal device, thereby transmitting a related instruction.

In some possible implementation modes, the method may further include the following operation.

A notification message sent by the network device is received, the notification message being configured for the terminal device to determine the first code block part and the at least one second code block part.

For example, the notification message includes a TBS of the TB and a IBS of the first code block part.

A TBS of the at least one second code block part is determined according to the TBS of the TB and TBS of the first code block part, which are sent by the network device, and a preset rule.

For example, the notification message includes the TBS of the TB and the TBS of the at least one second code block part.

The TBS of the first code block part is determined according to the TBS of the TB and TBS of the at least one second code block part, which are sent by the network device, and the preset rule.

For example, the notification message includes the TBS of the TB.

The TBS of the first code block part and the TBS of the at least one second code block part are determined according to the TBS of the TB, which is sent by the network device, and the preset rule.

For example, the notification message includes the TBS of the first code block part and the TBS of the at least one second code block part.

In the embodiments of the disclosure, the preset rule may refer to a magnitude relationship among the TBS of the TB, the TBS of the first code block part and the TBS of the at least one second code block part. For example, it may be predetermined by the preset rule that the TBS of the TB is a sum of the TBS of the first code block part and the TBS of the at least one second code block part. There are no limits made thereto.

In the embodiments of the disclosure, the preset rule may be predetermined by the network device and the terminal device or specified in the protocol. The same to the preset rule mentioned hereinafter.

Therefore, the terminal device may determine the first code block part and the at least one second code block part according to the notification message sent by the network device and in combination with the preset rule.

A second aspect provides a method for data transmission, which may include the following operation.

A sender device sends a first part and at least one second part of data on a time unit, first modulation and coding processing being adopted for the first part and second modulation and coding processing being adopted for the at least one second part.

According to the data transmission method of the embodiments of the disclosure, the sender device sends the first part and at least one second part of the data on the time unit, the first modulation and coding processing being adopted for the first part and the second modulation and coding processing being adopted for the at least one second part, and then a receiver device may demodulate the first part and the at least one second part, so that spectrum efficiency may be improved and rapid demodulation is further implemented.

In some possible implementation modes, the time unit occupies N time-domain symbols, the first code block part occupies the first L time-domain symbols of the N time-domain symbols and the at least one second code block part occupies the last K time-domain symbols in the N time-domain symbols, N being a positive integer greater than 1, L being a positive integer not greater than N and K being a positive integer not greater than N.

In some possible implementation modes, a sum of the L time-domain symbols occupied by the first part and the K time-domain symbols occupied by the at least one second part is the N time-domain symbols occupied by the time unit.

Or, the sum of the L time-domain symbols occupied by the first part and the K time-domain symbols occupied by the at least one second part is a sum of the N time-domain symbols occupied by the time unit and a time-domain symbol, the last time-domain symbol in the L time-domain symbols and the first time-domain symbol in the K time-domain symbols being the same time-domain symbol.

For example, during specific implementation, the sum of L and K may be N or the sum of L and K may also be N+1.

In some possible implementation modes, the first modulation and coding processing is different from the second modulation and coding processing in terms of at least one of coding manner, modulation manner, or coding rate.

In some possible implementation modes, a modulation level adopted for the second modulation and coding processing is not higher than a modulation level adopted for the first modulation and coding processing; and/or a coding rate adopted for the second modulation and coding processing is not higher than a coding rate adopted for the first modulation and coding processing.

In some possible implementation modes, a size of each code block in the at least one second part is not greater than a first threshold value.

In some possible implementation modes, the method may further include the following operation.

If the size of a target code block of the at least one second part is greater than a second threshold value, the sender device divides the target code block into multiple code sub-blocks, a size of each of the multiple code sub-blocks being not greater than the second threshold value and each of the multiple code sub-blocks being independently coded.

In some possible implementation modes, a corresponding code block of the first part includes multiple code sub-blocks and each of the multiple code sub-blocks is independently coded.

Alternatively, in some possible implementation modes, the method further includes the following operations.

A notification message is determined, the notification message being configured for a terminal device to determine the first code block part and the at least one second code block part.

The notification message is sent to the terminal device, the notification message being configured for the terminal device to determine a code block size of the first part and a code block size of the at least one second part.

In some possible implementation modes, the notification message includes a TBS of a TB and a TBS of the first code block part.

In some possible implementation modes, the notification message includes the TBS of the TB and a TBS of the at least one second code block part.

In some possible implementation modes, the notification message includes the TBS of the TB.

In some possible implementation modes, the notification message includes the TBS of the first code block part and the TBS of the at least one second code block part.

The network device may send the notification message to the terminal device to enable the terminal device to determine the TBS of the first code block part and the TBS of the second code block part according to the notification message and a preset rule.

In some possible implementation modes, the method may further include the following operation.

The network device receives capability information sent by the terminal device, the capability information being configured to indicate that the terminal device supports the data transmitted on the time unit to be divided into the first part and the at least one second part for transmission.

The network device may receive the capability information reported by the terminal device for a related operation. Alternatively, the network device may also directly send the notification message to the terminal device without combination with the capability information. There are no limits made thereto.

In some possible implementation modes, the method may further include the following operation.

First signaling is sent to the terminal device, the first signaling being configured to indicate a modulation and coding level corresponding to the first modulation and coding processing.

Herein, the network device may send signaling (for example, the first signaling) to the terminal device and indicate the modulation and coding level adopted for the first modulation and coding processing through the signaling to enable the terminal device to determine a modulation and coding level adopted for the second modulation and coding processing.

In some possible implementation modes, the method may further include the following operation.

Second signaling is sent to the terminal device, the second signaling being configured to indicate at least one of a value of K or a total number of the at least one second code block part.

Alternatively, the second signaling may also be configured to indicate the number of REs occupied by the at least one second code block part or configured to indicate a ratio of the number of the REs occupied by the at least one second code block part to the total number of REs. The terminal device may indirectly acquire the value of K according to information about the number of the REs.

Herein, the network device may send signaling (for example, the second signaling) to the terminal device and directly or indirectly indicate the value of K through the signaling to enable the terminal device to determine the at least one second code block part according to the value of K.

Alternatively, as an embodiment, the first part occupies a first frequency-domain resource for transmission and the at least one second part occupies a second frequency-domain resource for transmission, the first frequency-domain resource being different from the second frequency-domain resource.

Alternatively, as an embodiment, interleaving processing is performed on the first part of the data before the first part is coded; and/or interleaving processing is performed on the first part of the data after the first part is coded.

A third aspect provides a receiver device, which is configured to execute the method in the first aspect or any possible implementation mode of the first aspect. Specifically, the device includes units configured to execute the method in the first aspect or any possible implementation mode of the first aspect.

A fourth aspect provides a sender device, which is configured to execute the method in the second aspect or any possible implementation mode of the second aspect. Specifically, the device includes units configured to execute the method in the second aspect or any possible implementation mode of the second aspect.

A fifth aspect provides a receiver device. The receiver device includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the first aspect or any possible implementation mode of the first aspect.

A sixth aspect provides a sender device. The sender device includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the second aspect or any possible implementation mode of the second aspect.

A seventh aspect provides a computer-readable storage medium, which stores a program, the program enabling a receiver device to execute any data transmission method in the first aspect and each implementation mode thereof.

An eighth aspect provides a computer-readable storage medium, which stores a program, the program enabling a sender-side device to execute any data transmission method in the second aspect and each implementation mode thereof.

BRIEF DESCRIPTION OF DRAWINGS

In order to describe the technical solutions of the embodiments of the disclosure more clearly, the drawings required to be used in descriptions about the embodiments or the conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a present communication system like a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a future 5G system.

It is also to be understood that, in the embodiments of the disclosure, a network device may also be called a network-side device, a base station or the like. The base station may be a Base Transceiver Station (BTS) in the GSM or CDMA, may also be a NodeB in WCDMA and may also be an Evolutional Node B (eNB or eNodeB) in LIE, a base station device in a future 5G network or the like. There are no limits made thereto in the disclosure.

It is also to be understood that, in the embodiments of the disclosure, a terminal device may communicate with one or more core networks through a Radio Access Network (RAN). The terminal device may be called an access terminal, User Equipment (UE), a user unit, a user station, a mobile station, a mobile radio station, a remote station, a remote terminal, a mobile device, a user terminal, a terminal, a wireless communication device, a user agent or a user device. The terminal device may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network and the like.

Figures 1, 2:
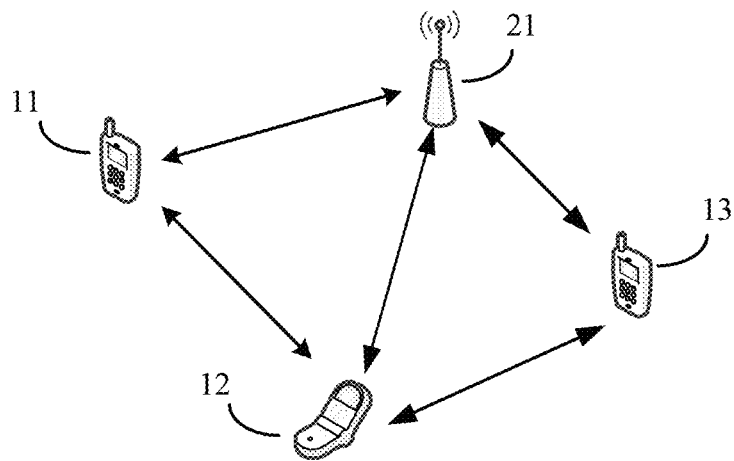
FIG. 1 is a schematic diagram of an application scenario.
FIG. 2 is a schematic flowchart of a method for data transmission according to an embodiment of the disclosure.

FIG. 1 is a schematic diagram of a scenario. It is to be understood that, for convenient comprehension, the scenario in FIG. 1 is introduced herein for description as an example but is not intended to limit the disclosure. FIG. 1 illustrates a terminal device 11, a terminal device 12, a terminal device 13 and a base station 21.

As illustrated in FIG. 1, the terminal device 11 may communicate with the base station 21, the terminal device 12 may communicate with the base station 21 and the terminal device 13 communicates with the base station 21. Alternatively, the terminal device 12 may also communicate with the terminal device 11. Alternatively, as another condition, the terminal device 13 communicates with the base station 12. Herein, when the terminal devices communicate with the base station, processing such as demodulation and decoding is performed on received signals and feedback information is sent.

However, in the conventional art, the same coding manner and the same modulation and coding level are adopted for a TB of data and a terminal device may start demodulation only after completely receiving time-domain symbols of the TB. Since a 5G system is required to support URLLC. Services of this type require a receiver to give a feedback rapidly, but rapid demodulation of data may not be implemented in a processing manner in the conventional art. Therefore, a terminal device or network device of this patent try to divide a TB of data into a first part and at least one second part and the first part and the at least one second part are independently coded, so that spectrum efficiency may be improved and rapid demodulation is further implemented.

FIG. 2 is a schematic flowchart of a method for data transmission 200 according to an embodiment of the disclosure. The method 200 may be executed by a receiver device. The receiver device may be a terminal device or a network device. Descriptions will be made herein with the terminal device as an example. For example, the terminal device may be a terminal device 11, terminal device 12 or terminal device 13 in FIG. 1. As illustrated in FIG. 2, the method 200 includes the following operations.

In S210, a receiver device receives a first part and at least one second part of data on a time unit, first modulation and coding processing being adopted for the first part and second modulation and coding processing being adopted for the at least one second part.

Alternatively, the time unit may be understood as a TB and the TB is divided into a first part (or called a first code block part, the first code block part mentioned hereinafter is the first part) and at least one second part (or called a second code block part, the second code block part mentioned hereinafter is the second part) for data transmission. For example, the time unit may be a basic unit of a time-domain physical resource configured for signal transmission and may specifically be a subframe, a TTI, a time slot, an OFDM symbol, an RE or the like. There are no limits made thereto.

In the embodiment of the disclosure, the at least one second part may be one or more code block parts (i.e., second code block parts) and there are no limits made to the number of the code block parts.

Alternatively, the time unit occupies N time-domain symbols, the first code block part occupies the first L time-domain symbols of the N time-domain symbols and the at least one second code block part occupies the last K time-domain symbols in the N time-domain symbols, N being a positive integer greater than 1, L being a positive integer not greater than N and K being a positive integer not greater than N.

Specifically, the terminal device may divide the TB into the first code block part and the at least one second code block part. The first code block part and the at least one second code block part are independently coded. For example, the first code block part is configured to be subjected to the first modulation and coding processing and the at least one second part is configured to be subjected to the second modulation and coding processing. The first modulation and coding processing refers to that a manner of relatively complex coding, interleaving and the like is adopted for the first code block part of the TB to improve demodulation performance, thereby improving transmission efficiency. For example, "complex coding" may include at least one of complex coding manners of a turbo code, a Low-Density Parity-Check (LDPC) code, a polar code and the like. The second modulation and coding processing refers to that simple coding processing is adopted, for example, time-domain interleaving processing is not adopted, for the at least one second code block part of the TB, so as to reduce a feedback delay. For example, "simple coding" may include at least one of simple coding manners of a Reed Muller (RM) code, a convolutional code and the like.

Alternatively, the first modulation and coding processing is different from the second modulation and coding processing in terms of at least one of coding manner, modulation manner, or coding rate.

For example, alternatively, a modulation level adopted for the second modulation and coding processing over the at least one second code block part is not higher than a modulation level adopted for the first modulation and coding processing over the first code block part; and/or a coding rate adopted for the second modulation and coding processing over the at least one second code block part is not higher than a coding rate adopted for the first modulation and coding processing over the first code block part.

In the embodiment of the disclosure, a processing manner of complex coding, interleaving and the like may be adopted for the first code block part and demodulation performance of the first code block part is higher than that of the at least one second code block part. Alternatively, a lower Modulation and Coding Scheme (MCS) may be adopted for the first code block part to ensure similar demodulation performance of the first code block part and the at least one second code block part.

Alternatively, in the embodiment of the disclosure, interleaving processing may be performed on the first part after channel coding and includes interleaving manners of inter-code-block interleaving, time-domain interleaving and the like; and interleaving processing is not performed on the at least one second part after channel coding.

Alternatively, interleaving processing may be performed on the first part of the data before the first part is coded; and/or interleaving processing may also be performed on the first part of the data after the first part is coded. There are no limits made thereto.

Alternatively, a resource mapping manner for the at least one second code block part may be a manner of a frequency domain at first and then a time domain.

Alternatively, the first code block part may include multiple code sub-blocks. Specifically, the first code block part may further be divided into the multiple code sub-blocks and the multiple code sub-blocks are independently coded. Therefore, a terminal device may adopt a parallel decoder to implement rapid decoding.

In S220, the receiver device demodulates the first part and the at least one second part.

Specifically, the receiver device may receive the first part and at least one second part of the data on the N time-domain symbols occupied by the time unit. A relatively complex coding processing manner is adopted for the first part and a relatively simple coding processing manner is adopted for the at least one second part. Then, the first part and the at least one second part are demodulated or decoded.

In such a manner, according to the data transmission method of the embodiment of the disclosure, the receiver device receives the first part and at least one second part of the data on the time unit, the first modulation and coding processing being adopted for the first part and the second modulation and coding processing being adopted for the at least one second part, and the first part and the at least one second part are demodulated, so that spectrum efficiency may be improved and rapid demodulation is further implemented.

In the embodiment of the disclosure, when the receiver device is a terminal device, the terminal device determines the first code block part and at least one second code block part of the TB. The first code block part is configured to be subjected to the first modulation and coding processing and the at least one second code block part is configured to be subjected to the second modulation and coding processing. The TB occupies the N time-domain symbols, the first code block part occupies the first L time-domain symbols of the N time-domain symbols and the at least one second code block part occupies the last K time-domain symbols in the N time-domain symbols. Transmitting the first code block part and the at least one second code block part on the N time-domain symbols may improve spectrum efficiency, thereby implementing rapid demodulation.

It is to be understood that, in the embodiment of the disclosure, numbers "first", "second" and the like are introduced only to distinguish different objects, for example, to distinguish different "code block parts" or distinguish different "modulation and coding processing" manners. Numbers appearing hereinafter are also adopted to distinguish different objects. All of these are not intended to limit the disclosure.

It is also to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Alternatively, as an embodiment, the receiver device is the terminal device and the method 200 may further include the following operations.

The terminal device receives first signaling sent by a network device, the first signaling being configured to indicate a modulation and coding level corresponding to the first modulation and coding processing.

The terminal device determines a modulation and coding level corresponding to the second modulation and coding processing according to the first signaling; or, the terminal device determines at least one of a modulation manner or coding rate corresponding to the second modulation and coding processing according to the first signaling.

Specifically, the modulation and coding level adopted for the first modulation and coding processing over the first code block part of the terminal device may be indicated by the network device through signaling (for example, the first signaling). The terminal device receives the first signaling sent by the network device to learn about the modulation and coding level adopted for the first modulation and coding processing and determines the modulation manner (for example, the coding rate and the modulation and coding level) adopted for the second modulation and coding processing over the at least one second part according to the modulation and coding level adopted for the first modulation and coding processing. For example, the terminal device may select a modulation and coding level lower than that adopted for the first modulation and coding processing as the modulation and coding level adopted for the second modulation and coding processing.

Alternatively, in the embodiment of the disclosure, the first signaling may be configuration signaling transmitted to the terminal device by the network device.

Alternatively, as an embodiment, the receiver device is the terminal device and the method 200 may further include the following operations.

The terminal device receives second signaling sent by the network device, the second signaling being configured to indicate at least one of a value of K or a total number of the at least one second part.

Specifically, the terminal device receives the second signaling sent by the network device, the second signaling being configured to indicate the value of K and/or being configured to indicate a total number of the at least one second part. The terminal device may determine the first code block part and the at least one second code block part according to the second signaling.

In the embodiment of the disclosure, the second signaling may directly indicate the value of K and may also indirectly indicate the value of K. For example, alternatively, the second signaling may also be configured to indicate the number of REs occupied by the at least one second code block part or configured to indicate a ratio of the number of the REs occupied by the at least one second code block part to the total number of REs. The terminal device may indirectly acquire the value of K according to information about the number of the REs.

Alternatively, in the embodiment of the disclosure, the second signaling may be configuration signaling, for example, DCI signaling, transmitted to the terminal device by the network device.

In the embodiment of the disclosure, the value of K may be configured by the network device or specified by a protocol. There are no limits made thereto.

Alternatively, as an embodiment, the first part occupies a first frequency-domain resource for transmission and the at least one second part occupies a second frequency-domain resource for transmission, the first frequency-domain resource being different from the second frequency-domain resource.

Specifically, the terminal device may map the first code block part to the first frequency-domain resource in the L time-domain symbols and map the at least one second code block part to the second frequency-domain resource in the K time-domain symbols, the first frequency-domain resource being different from the second frequency-domain resource.

Alternatively, in the embodiment of the disclosure, a TBS of each second code block part in the at least one second code block part is not greater than a first threshold value.

Herein, the first threshold value is introduced to specific a TBS upper limit of the second code block part to ensure rapid demodulation of the second code block part.

Alternatively, the first threshold value may be configured by the network device or specified by the protocol. There are no limits made thereto.

Alternatively, as an embodiment, the method 200 further includes the following operation.

If a size of a target code block of the at least one second part is greater than a second threshold value, the receiver device divides the target code block into multiple code sub-blocks, a size of each of the multiple code sub-blocks being not greater than the second threshold value and each of the multiple code sub-blocks being independently coded.

Herein, the target code block may be one code block part in the at least one second part.

In other words, if a TBS of a second code block part in the at least one second code block part is greater than the second threshold value, the second code block part is divided into multiple code sub-blocks, a TBS of each of the multiple code sub-blocks being not greater than the second threshold value.

Specifically, if a TBS of a second code block part in the at least one second code block part is greater than the second threshold value, the second code block part may be divided into multiple code sub-blocks, a TBS of each of the multiple code sub-blocks being not greater than the second threshold value. The terminal device may adopt a parallel decoder to demodulate the multiple code sub-blocks to implement rapid decoding.

Alternatively, the second threshold value may be configured by the network device or specified by the protocol. There are no limits made thereto.

In such a manner, according to the data transmission method of the embodiment of the disclosure, the receiver device receives the first part and at least one second part of the data on the time unit, the first modulation and coding processing being adopted for the first part and the second modulation and coding processing being adopted for the at least one second part, and the first part and the at least one second part are demodulated, so that the spectrum efficiency may be improved and rapid demodulation is further implemented. Furthermore, uplink of the at least one second part may be specified to implement parallel demodulation.

Alternatively, as an embodiment, the method 200 may further include the following operation.

Capability information is sent to the network device, the capability information being configured to indicate that the terminal device supports the data transmitted on the time unit to be divided into the first part and the at least one second part for transmission.

Specifically, the terminal device may report the capability information to the network device, the capability information being configured to indicate that the terminal device supports the data (or the TB) transmitted on the time unit to be divided into the first part and the at least one second part for transmission. In such a manner, the network device may learn about the capability information of the terminal device, thereby transmitting a related instruction.

Alternatively, as an embodiment, the method 200 may further include the following operation.

A notification message sent by the network device is received, the notification message being configured for the terminal device to determine the first code block part and the at least one second code block part.

Specifically, the terminal device may receive the notification message sent by the network device and then determine the first code block part and the at least one second code block part according to the notification message. For example, the notification message may include the TBS of the TB, and/or a TBS of the first code block part and a TBS of the at least one second code block part.

Alternatively, as an embodiment, the notification message includes the TBS of the TB and the TBS of the first code block part.

The TBS of the at least one second code block part is determined according to the TBS of the TB and TBS of the first code block part, which are sent by the network device, and a preset rule.

Specifically, the terminal device may receive a total TBS of the TB and IBS of the first code block part, which are sent by the network device, and may determine the TBS of the at least one second code block part in combination with the preset rule.

In the embodiment of the disclosure, the preset rule may refer to a magnitude relationship among the TBS of the TB, the IBS of the first code block part and the TBS of the at least one second code block part. For example, it may be predetermined by the preset rule that the TBS of the is a sum of the TBS of the first code block part and the TBS of the at least one second code block part. There are no limits made thereto.

In the embodiment of the disclosure, the preset rule may be predetermined by the network device and the terminal device or specified in the protocol. The same to the preset rule mentioned hereinafter.

Alternatively, as an embodiment, the notification message includes the TBS of the TB and the TBS of the at least one second code block part.

The TBS of the first code block part is determined according to the TBS of the TB and TBS of the at least one second code block part, which are sent by the network device, and the preset rule.

Specifically, the terminal device may receive the total TBS of the TB and TBS of the at least one second code block part, which are sent by the network device, and may determine the TBS of the first code block part in combination with the preset rule.

Alternatively, as an embodiment, the notification message includes the TBS of the TB.

The TBS of the first code block part and the TBS of the at least one second code block part are determined according to the TBS of the TB, which is sent by the network device, and the preset rule.

Specifically, the terminal device may receive the total TBS of the TB, which is sent by the network device, and may determine the TBS of the first code block part and the TBS of the at least one second code block part in combination with the preset rule.

Alternatively, as an embodiment, the notification message includes the TBS of the first code block part and the TBS of the at least one second code block part.

Specifically, the terminal device may directly receive the TBS of the first code block part and TBS of the at least one second code block part, which are sent by the network device.

From the above, the TBS of the first code block part and the TBS of the at least one second code block part may be calculated by the terminal device in combination with the notification message sent by the network device and may also be acquired in a manner that the terminal device directly receives a specific value sent by the network device. There are no limits made thereto.

In such a manner, according to the data transmission method of the embodiment of the disclosure, the receiver device receives the first part and at least one second part of the data on the time unit, the first modulation and coding processing being adopted for the first part and the second modulation and coding processing being adopted for the at least one second part, and the first part and the at least one second part are demodulated, so that the spectrum efficiency may be improved and rapid demodulation is further implemented.

Alternatively, as an embodiment, a sum of the L time-domain symbols occupied by the first part and the K time-domain symbols occupied by the at least one second part is the N time-domain symbols occupied by the time unit.

Or, the sum of the L time-domain symbols occupied by the first part and the K time-domain symbols occupied by the at least one second part is a sum of the N time-domain symbols occupied by the time unit and a time-domain symbol, the last time-domain symbol in the L time-domain symbols and the first time-domain symbol in the K time-domain symbols being the same time-domain symbol.

Specifically, as an embodiment, the L time-domain symbols+the K time-domain symbols=the N time-domain symbols, or the L time-domain symbols+the K time-domain symbols=the N time-domain symbols+1. The latter condition refers to that the last time-domain symbol in the L time-domain symbols for the first part and the first time-domain symbol in the K time-domain symbols for the at least one second part may multiplex the same time-domain symbol.

For enabling those skilled in the art to conveniently understand a distribution of the time-domain symbols for the first part and the at least one second part in the embodiment of the disclosure, descriptions will now be made in combination with FIG. 3A to FIG. 3D.

Figure 3A:
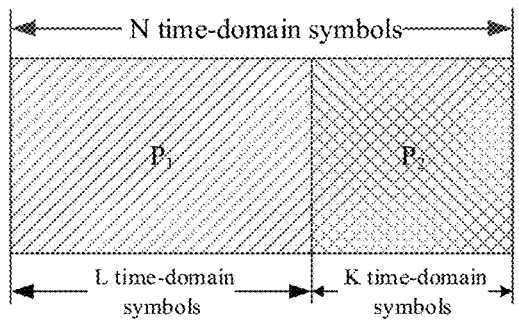
FIG. 3A is a schematic diagram of an example of code block parts according to an embodiment of the disclosure.

FIG. 3A is a schematic diagram of an example of code block parts according to an embodiment of the disclosure. As illustrated in FIG. 3A, a code block part $P_1$ (which may be configured to represent a first code block part) corresponding to  occupies L time-domain symbols and a code block part $P_2$ (which may be configured to represent a second code block part) corresponding to  occupies K time-domain symbols, a sum of L and K being N and N being a positive integer greater than 1. In FIG. 3A, N time-domain symbols occupied by a TB may be divided into the first code block part $P_1$ and the second code block part $P_2$.

Figure 3B:
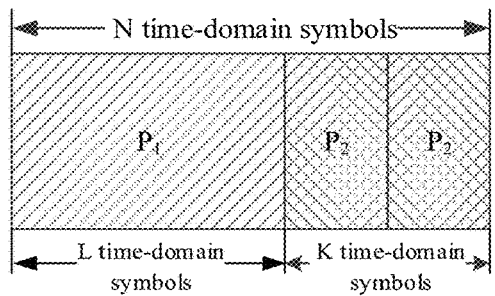
FIG. 3B is a schematic diagram of another example of code block parts according to an embodiment of the disclosure.

FIG. 3B is a schematic diagram of another example of code block parts according to an embodiment of the disclosure. As illustrated in FIG. 3B, a code block part $P_1$ (which may be configured to represent a first code block part) corresponding to  occupies L time-domain symbols and code block parts $P_2$ (which may be configured to represent second code block parts) corresponding to  occupy K time-domain symbols, a sum of L and K being N and N being a positive integer greater than 1. In FIG. 3B, N time-domain symbols occupied by a TB may be divided into the first code block part $P_1$ and two second code block parts $P_2$. It is to be understood that descriptions are made herein only with the two second code block parts as an example and there may be more second code block parts. There are no limits made thereto.

Figure 3C:
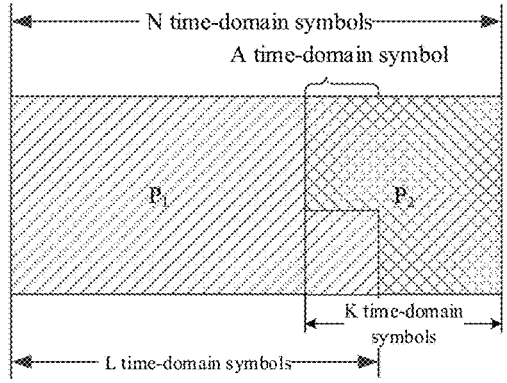
FIG. 3C is a schematic diagram of another example of code block parts according to an embodiment of the disclosure.

FIG. 3C is a schematic diagram of another example of code block parts according to an embodiment of the disclosure. As illustrated in FIG. 3C, a code block part $P_1$ (which may be configured to represent a first code block part) corresponding to  occupies L time-domain symbols and a code block part $P_2$ (which may be configured to represent a second code block part) corresponding to  occupies K time-domain symbols, a sum of L and K being N+1 and N being a positive integer greater than 1. In FIG. 3C, N time-domain symbols occupied by a TB may be divided into the first code block part $P_1$ and the second code block part $P_2$. The first code block part $P_1$ and the second code block part $P_2$ may multiplex a time-domain symbol. Specifically, the last time-domain symbol in the L time-domain symbols and the first time-domain symbol in the K time-domain symbols are the same time-domain symbol.

Figure 3D:
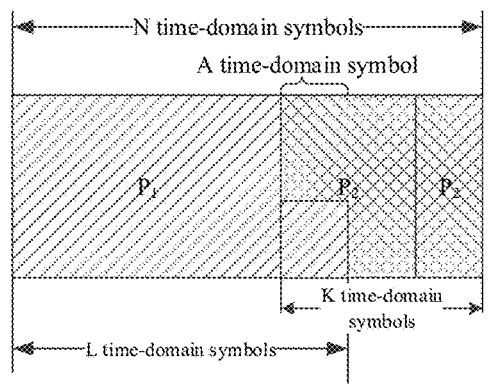
FIG. 3D is a schematic diagram of another example of code block parts according to an embodiment of the disclosure.

FIG. 3D is a schematic diagram of another example of code block parts according to an embodiment of the disclosure. As illustrated in FIG. 3D, a code block part $P_1$ (which may be configured to represent a first code block part) corresponding to  occupies L time-domain symbols and code block parts $P_2$ (which may be configured to represent second code block parts) corresponding to  occupy K time-domain symbols, a sum of L and K being N+1 and N being a positive integer greater than 1. In FIG. 3D, N time-domain symbols occupied by a TB may be divided into the first code block part $P_1$ and two second code block parts $P_2$. The first code block part $P_1$ and the two second code block parts $P_2$ may multiplex a time-domain symbol. Specifically, the last time-domain symbol in the L time-domain symbols and the first time-domain symbol in the K time-domain symbols are the same time-domain symbol. It is to be understood that descriptions are made herein only with the two second code block parts as an example and there may be more second code block parts. There are no limits made thereto.

It is to be understood that FIG. 3A to FIG. 3D only illustrate some possible implementation modes according to the embodiments of the disclosure and are not intended to limit the disclosure. During a practical application, there may also be more implementation modes. There are no limits made thereto.

The data transmission method according to the embodiments of the disclosure is described above from the angle of the receiver device. The data transmission method according to the embodiments of the disclosure will be described below from the angle of a sender device. For simplicity, some repeated concepts or terms will not be elaborated.

Figure 4:
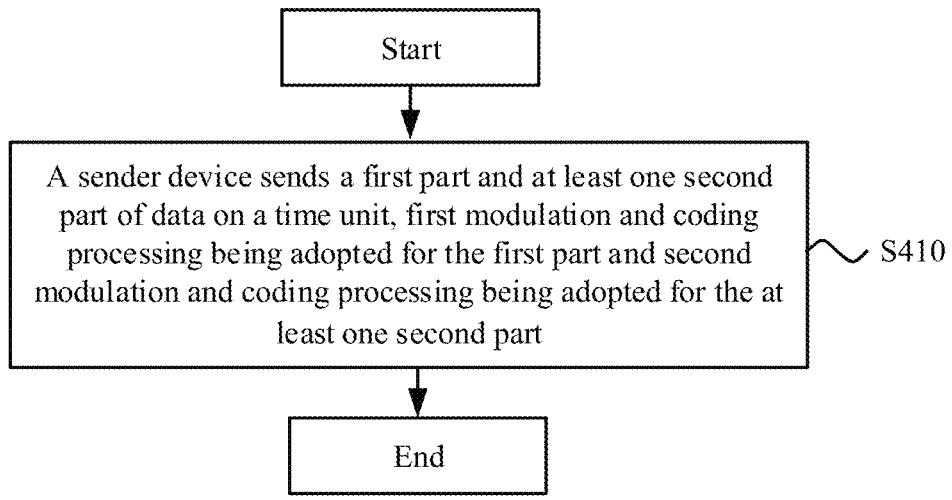
FIG. 4 is a schematic flowchart of a method for data transmission according to another embodiment of the disclosure.

FIG. 4 is a schematic flowchart of a method for data transmission 400 according to another embodiment of the disclosure. The method 400 is executed by a sender device. The sender device may be a terminal device or a network device. Descriptions will be made herein with the network device as an example. For example, the network device may be a base station 21 in FIG. 1. As illustrated in FIG. 4, the method 400 includes the following operation.

In S410, the sender device sends a first part and at least one second part of data on a time unit, first modulation and coding processing being adopted for the first part and second modulation and coding processing being adopted for the at least one second part.

According to the data transmission method of the embodiment of the disclosure, the sender device sends the first part and at least one second part of the data on the time unit, the first modulation and coding processing being adopted for the first part and the second modulation and coding processing being adopted for the at least one second part, and then a receiver device may demodulate the first part and the at least one second part, so that spectrum efficiency may be improved and rapid demodulation is further implemented.

It is to be understood that, in the embodiment of the disclosure, such a processing manner of dividing the first part and the at least one second part is universal for both of the receiver device and the sender device. For simplicity, no more elaborations will be made. A receiver may receive coded data sent by a sender for decoding.

Alternatively, as an embodiment, the time unit occupies N time-domain symbols, the first code block part occupies the first L time-domain symbols of the N time-domain symbols and the at least one second code block part occupies the last K time-domain symbols in the N time-domain symbols, N being a positive integer greater than 1, L being a positive integer not greater than N and K being a positive integer not greater than N.

Alternatively, as an embodiment, the first modulation and coding processing is different from the second modulation and coding processing in terms of at least one of coding manner, modulation manner, or coding rate.

Alternatively, as an embodiment, a modulation level adopted for the second modulation and coding processing is not higher than a modulation level adopted for the first modulation and coding processing; and/or a coding rate adopted for the second modulation and coding processing is not higher than a coding rate adopted for the first modulation and coding processing.

Alternatively, as an embodiment, a size of each code block in the at least one second part is not greater than a first threshold value.

Alternatively, as an embodiment, the method 400 may further include the following operation.

If the size of a target code block of the at least one second part is greater than a second threshold value, the sender device divides the target code block into multiple code sub-blocks, a size of each of the multiple code sub-blocks being not greater than the second threshold value and each of the multiple code sub-blocks being independently coded.

Alternatively, as an embodiment, a corresponding code block of the first part includes multiple code sub-blocks and each of the multiple code sub-blocks is independently coded.

Alternatively, as an embodiment, the sender device is the network device and the method 400 may further include the following operation.

A notification message is sent to a terminal device, the notification message being configured for the terminal device to determine a code block size of the first part and a code block size of the at least one second part.

In the embodiment of the disclosure, the network device may determine the notification message and send the notification message to the terminal device to enable the terminal device to determine the first code block part and at least one second code block part of a TB according to the notification message.

Alternatively, as an embodiment, the notification message includes a TBS of the TB corresponding to the time unit and a TBS of the first code block part.

The network device may provide the TBS of the TB and the TBS of the first code block part for the terminal device to enable the terminal device to determine a TBS of the at least one second code block part according to the TBS of the TB, the TBS of the first code block part and a preset rule.

Alternatively, as an embodiment, the notification message includes the TBS of the TB and the TBS of the at least one second code block part.

The network device may provide the TBS of the TB and the TBS of the at least one second code block part for the terminal device to enable the terminal device to determine the TBS of the first code block part according to the TBS of the TB, the TBS of the at least one second code block part and the preset rule.

Alternatively, as an embodiment, the notification message includes the TBS of the TB.

The network device may provide the TBS of the TB for the terminal device to enable the terminal device to determine the TBS of the first code block part and the TBS of the at least one second code block part according to the TBS of the TB and the preset rule.

Alternatively, as an embodiment, the notification message includes the TBS of the first code block part and the TBS of the at least one second code block part.

The network device may directly provide the TBS of the first code block part and the TBS of the at least one second code block part for the terminal device.

Alternatively, as an embodiment, the method 400 may further include the following operation.

The network device receives capability information sent by the terminal device, the capability information being configured to indicate that the terminal device supports the data transmitted on the time unit to be divided into the first part and the at least one second part for transmission.

Specifically, the network device may receive the capability information reported by the terminal device, the capability information being configured to indicate that the terminal device supports the TB to be divided into the first part and the at least one second part for transmission.

Alternatively, the network device may send the notification message to the terminal device according to the capability information.

Alternatively, as an embodiment, the method 400 may further include the following operation.

First signaling is sent to the terminal device, the first signaling being configured to indicate a modulation and coding level corresponding to the first modulation and coding processing.

Specifically, the network device may send the first signaling to the terminal device, the first signaling being configured to indicate the modulation and coding level adopted for the first modulation and coding processing over the first code block part of the terminal device, and then the terminal device may determine a modulation manner for the second modulation and coding processing according to the first signaling.

Alternatively, as an embodiment, a sum of the L time-domain symbols occupied by the first part and the K time-domain symbols occupied by the at least one second part is the N time-domain symbols occupied by the time unit.

Or, the sum of the L time-domain symbols occupied by the first part and the K time-domain symbols occupied by the at least one second part is a sum of the N time-domain symbols occupied by the time unit and a time-domain symbol, the last time-domain symbol in the L time-domain symbols and the first time-domain symbol in the K time-domain symbols being the same time-domain symbol.

Alternatively, as an embodiment, the method 400 may further include the following operation.

Second signaling is sent to the terminal device, the second signaling being configured to indicate a value of K or being configured to indicate a total number of the at least one second part.

Specifically, the network device may configure the value of K through signaling (for example, the second signaling), may directly indicate the value of K and may also indirectly indicate the value of K. "indirect indication" refers to that the number of REs occupied by the at least one second code block part is indicated through the signaling, or a ratio of the number of the REs occupied by the at least one second code block part to the total number of REs is indicated through the signaling. The terminal device may learn about or calculate the value of K according to the second signaling.

Alternatively, as an embodiment, the first part occupies a first frequency-domain resource for transmission and the at least one second part occupies a second frequency-domain resource for transmission, the first frequency-domain resource being different from the second frequency-domain resource.

Alternatively, as an embodiment, interleaving processing is performed on the first part of the data before the first part is coded; and/or interleaving processing is performed on the first part of the data after the first part is coded.

In such a manner, according to the data transmission method of the embodiment of the disclosure, the sender device sends the first part and at least one second part of the data on the time unit, the first modulation and coding processing being adopted for the first part and the second modulation and coding processing being adopted for the at least one second part, and then a receiver device may demodulate the first part and the at least one second part, so that the spectrum efficiency may be improved and rapid demodulation is further implemented.

A method for data transmission according to the embodiments of the disclosure is described above in detail. A receiver device and sender device according to the embodiments of the disclosure will be described below respectively.

Figure 5:
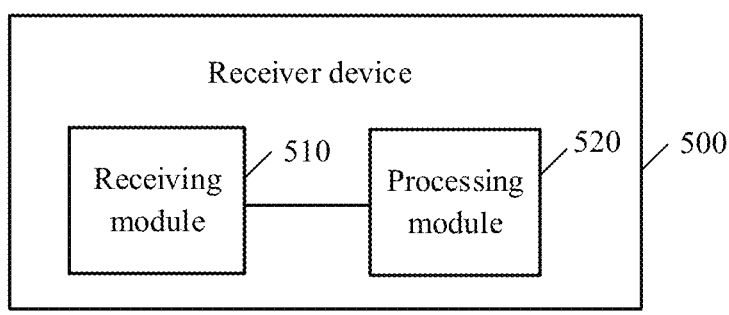
FIG. 5 is a schematic block diagram of a receiver device according to an embodiment of the disclosure.

FIG. 5 is a schematic block diagram of a receiver device 500 according to an embodiment of the disclosure. Alternatively, the receiver device may be a terminal device. As illustrated in FIG. 5, the receiver device 500 includes a receiving module 510 and a processing module 520.

The receiving module 510 is configured to receive a first part and at least one second part of data on a time unit, first modulation and coding processing being adopted for the first part and second modulation and coding processing being adopted for the at least one second part.

The processing module 520 is configured to demodulate the first part and the at least one second part.

In the embodiment of the disclosure, the receiver device receives the first part and at least one second part of the data on the time unit, the first modulation and coding processing being adopted for the first part and the second modulation and coding processing being adopted for the at least one second part, and the first part and the at least one second part are demodulated, so that spectrum efficiency may be improved and rapid demodulation is further implemented.

Alternatively, the time unit occupies N time-domain symbols, the first part occupies the first L time-domain symbols of the N time-domain symbols and the at least one second part occupies the last K time-domain symbols in the N time-domain symbols, N being a positive integer greater than 1, L being a positive integer not greater than N and K being a positive integer not greater than N.

In such a manner, the receiver device 500 of the embodiment of the disclosure determines the first part and at least one second part of a TB. The first part is configured to be subjected to the first modulation and coding processing and the at least one second part is configured to be subjected to the second modulation and coding processing. The TB occupies the N time-domain symbols, the first part occupies the first L time-domain symbols of the N time-domain symbols and the at least one second part occupies the last K time-domain symbols in the N time-domain symbols. Transmitting the first part and the at least one second part on the N time-domain symbols may improve the spectrum efficiency, thereby implementing rapid demodulation.

Alternatively, as an embodiment, the first modulation and coding processing is different from the second modulation and coding processing in terms of at least one of coding manner, modulation manner, or coding rate.

Alternatively, as an embodiment, a modulation level adopted for the second modulation and coding processing is not higher than a modulation level adopted for the first modulation and coding processing; and/or a coding rate adopted for the second modulation and coding processing is not higher than a coding rate adopted for the first modulation and coding processing.

Alternatively, as an embodiment,

Alternatively, as an embodiment, a size (for example, a TBS) of each code block in the at least one second part is not greater than a first threshold value.

Alternatively, as an embodiment, the processing module 520 is further configured to, if the TBS of a second part in the at least one second part is greater than a second threshold value, divide the second part into multiple code sub-blocks, a TBS of each of the multiple code sub-blocks being not greater than the second threshold value and each of the multiple code sub-blocks being independently coded.

Alternatively, as an embodiment, the first part includes multiple code sub-blocks and each of the multiple code sub-blocks is independently coded.

Alternatively, as an embodiment, the receiver device further includes a sending module.

The sending module is configured to send capability information to a network device, the capability information being configured to indicate that the receiver device supports the data transmitted on the time unit to be divided into the first part and the at least one second part for transmission.

Alternatively, as an embodiment, the receiving module 510 is further configured to:

receive a notification message sent by the network device, the notification message being configured to determine a code block size of the first part and a code block size of the at least one second part.

Alternatively, as an embodiment, the notification message includes a TBS of the TB corresponding to the time unit and a TBS of the first part.

The processing module 520 is specifically configured to:

determine a TBS of the at least one second part according to the TBS of the TB and TBS of the first code block part, which are sent by the network device, and a preset rule.

Alternatively, as an embodiment, the notification message includes the TBS of the TB and the TBS of the at least one second part.

The processing module 520 is specifically configured to:

determine the TBS of the first part according to the TBS of the TB and TBS of the at least one second part, which are sent by the network device, and the preset rule.

Alternatively, as an embodiment, the notification message includes the TBS of the TB.

The processing module 520 is specifically configured to:

determine the TBS of the first code block part and the TBS of the at least one second code block part according to the TBS of the TB, which is sent by the network device, and the preset rule.

Alternatively, as an embodiment, the notification message includes the TBS of the first part and the TBS of the at least one second part.

Alternatively, as an embodiment, the receiving module 510 is further configured to:

receive first signaling sent by a network device, the first signaling being configured to indicate a modulation and coding level adopted for the first modulation and coding processing over the first part of the terminal device.

The processing module 520 is specifically configured to:

determine a modulation and coding level corresponding to the second modulation and coding processing according to the first signaling, or determine at least one of a modulation manner or coding rate corresponding to the second modulation and coding processing according to the first signaling.

Alternatively, as an embodiment, a sum of the L time-domain symbols occupied by the first part and the K time-domain symbols occupied by the at least one second part is the N time-domain symbols occupied by the time unit.

Or, the sum of the L time-domain symbols occupied by the first part and the K time-domain symbols occupied by the at least one second part is a sum of the N time-domain symbols occupied by the time unit and a time-domain symbol, the last time-domain symbol in the L time-domain symbols and the first time-domain symbol in the K time-domain symbols being the same time-domain symbol.

Alternatively, as an embodiment, the receiving module 510 is further configured to:

receive second signaling sent by the network device, the second signaling being configured to indicate at least one of a value of K or a total number of the at least one second part.

Alternatively, as an embodiment, the first part occupies a first frequency-domain resource for transmission and the at least one second part occupies a second frequency-domain resource for transmission, the first frequency-domain resource being different from the second frequency-domain resource.

Alternatively, as an embodiment, interleaving processing is performed on the first part of the data before the first part is coded; and/or interleaving processing is performed on the first part of the data after the first part is coded.

The receiver device 500 according to the embodiment of the disclosure may execute the data transmission method 200 according to the embodiment of the disclosure and the abovementioned and other operations and/or functions of each module in the receiver device 500 are adopted to implement the corresponding flows of each method respectively and will not be elaborated herein for simplicity.

In such a manner, the receiver device 500 of the embodiment of the disclosure receives the first part and at least one second part of the data on the time unit, the first modulation and coding processing being adopted for the first part and the second modulation and coding processing being adopted for the at least one second part, and the first part and the at least one second part are demodulated, so that the spectrum efficiency may be improved and rapid demodulation is further implemented.

The receiver device according to the embodiments of the disclosure is described above in combination with FIG. 5 and a sender device according to the embodiments of the disclosure will be described below in combination with FIG. 6.

Figure 6:
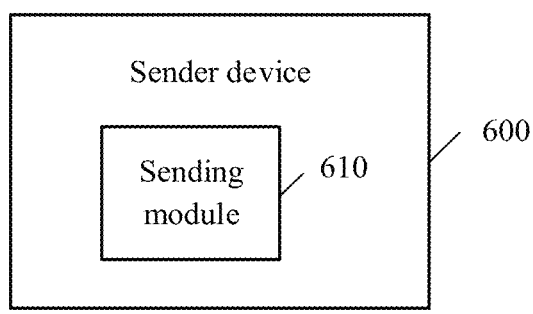
FIG. 6 is a schematic block diagram of a sender device according to an embodiment of the disclosure.

FIG. 6 is a schematic block diagram of a sender device 600 according to an embodiment of the disclosure. The sender device may be a network device. As illustrated in FIG. 6, the sender device 600 includes a sending module 610.

The sending module 610 is configured to send a first part and at least one second part of data on a time unit, first modulation and coding processing being adopted for the first part and second modulation and coding processing being adopted for the at least one second part.

In the embodiment of the disclosure, the sender device 600 sends the first part and at least one second part of the data on the time unit, the first modulation and coding processing being adopted for the first part and the second modulation and coding processing being adopted for the at least one second part, and then a receiver device may demodulate the first part and the at least one second part, so that the spectrum efficiency may be improved and rapid demodulation is further implemented.

Alternatively, as an embodiment, the sender device 600 further includes a determination module.

The determination module is configured to determine a notification message, the notification message being configured for a receiver device to determine the first code block part and the at least one second code block part.

Alternatively, the sending module 610 is further configured to send the notification message determined by the determination module to the receiver device.

Alternatively, the time unit occupies N time-domain symbols, the first code block part occupies the first L time-domain symbols of the N time-domain symbols and the at least one second code block part occupies the last K time-domain symbols in the N time-domain symbols, N being a positive integer greater than 1, L being a positive integer not greater than N and K being a positive integer not greater than N.

Alternatively, as an embodiment, a sum of the L time-domain symbols occupied by the first part and the K time-domain symbols occupied by the at least one second part is the N time-domain symbols occupied by the time unit.

Or, the sum of the L time-domain symbols occupied by the first part and the K time-domain symbols occupied by the at least one second part is a sum of the N time-domain symbols occupied by the time unit and a time-domain symbol, the last time-domain symbol in the L time-domain symbols and the first time-domain symbol in the K time-domain symbols being the same time-domain symbol.

Alternatively, as an embodiment, the first modulation and coding processing is different from the second modulation and coding processing in terms of at least one of coding manner, modulation manner, or coding rate.

Alternatively, as an embodiment, a modulation level adopted for the second modulation and coding processing is not higher than a modulation level adopted for the first modulation and coding processing; and/or
a coding rate adopted for the second modulation and coding processing is not higher than a coding rate adopted for the first modulation and coding processing.

Alternatively, as an embodiment, the notification message includes a TBS of the time unit and a TBS of the first code block part.

Alternatively, as an embodiment, the notification message includes the TBS of the time unit and a TBS of the at least one second code block part.

Alternatively, as an embodiment, the notification message includes the TBS of the time unit.

Alternatively, as an embodiment, the notification message includes the TBS of the first code block part and the TBS of the at least one second code block part.

Alternatively, as an embodiment, a size of each code block in the at least one second part is not greater than a first threshold value.

Alternatively, as an embodiment, the sender device 600 further includes a processing module.

The processing module is configured to, if the size of a target code block of the at least one second part is greater than a second threshold value, divide the target code block into multiple code sub-blocks, a size of each of the multiple code sub-blocks being not greater than the second threshold value and each of the multiple code sub-blocks being independently coded.

Alternatively, as an embodiment, a corresponding code block of the first part includes multiple code sub-blocks and each of the multiple code sub-blocks is independently coded.

Alternatively, as an embodiment, the network device further includes a receiving module.

The receiving module is configured to receive capability information sent by the terminal device, the capability information being configured to indicate that the terminal device supports the data transmitted on the time unit to be divided into the first code block part and the at least one second code block part for transmission.

The sending module 610 is specifically configured to:
send the notification message to the terminal device according to the capability information.

Alternatively, as an embodiment, the sending module 610 is further configured to:
send first signaling to the terminal device, the first signaling being configured to indicate a modulation and coding level corresponding to the first modulation and coding processing.

Alternatively, as an embodiment, the sending module 610 is further configured to:
send second signaling to the terminal device, the second signaling being configured to indicate a value of K or being configured to indicate the total number of the at least one second code block part.

Alternatively, as an embodiment, the first part occupies a first frequency-domain resource for transmission and the at least one second part occupies a second frequency-domain resource for transmission, the first frequency-domain resource being different from the second frequency-domain resource.

Alternatively, as an embodiment, interleaving processing is performed on the first part of the data before the first part is coded; and/or interleaving processing is performed on the first part of the data after the first part is coded.

The sender device 600 according to the embodiment of the disclosure may execute the data transmission method 400 according to the embodiment of the disclosure and the abovementioned and other operations and/or functions of each module in the sender device 600 are adopted to implement the corresponding flows of each method respectively and will not be elaborated herein for simplicity.

In such a manner, the sender device 600 of the embodiment of the disclosure sends the first part and at least one second part of the data on the time unit, the first modulation and coding processing being adopted for the first part and the second modulation and coding processing being adopted for the at least one second part, and then a receiver device may demodulate the first part and the at least one second part, so that the spectrum efficiency may be improved and rapid demodulation is further implemented.

Figure 7:
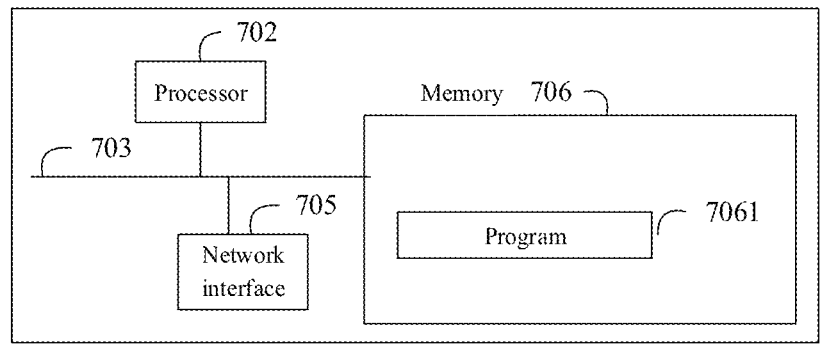
FIG. 7 is a structure diagram of a receiver device according to another embodiment of the disclosure.

FIG. 7 is a device structure of a receiver device according to another embodiment of the disclosure. The structure includes at least one processor 702 (for example, Central Processing Unit (CPU)), at least one network interface 705 or other communication interface, a memory 706 and at least one communication bus 703 configured to implement connection communication between these devices. The processor 702 is configured to execute an executable module, for example, a computer program, stored in the memory 706. The memory 706 may include a high-speed Random Access Memory (RAM) and may also include a non-volatile memory, for example, at least one disk memory. A communication connection with at least one other network element is implemented through the at least one network interface 705 (which may be wired or wireless).

In some implementation modes, the memory 706 stores a program 7061 and the processor 702 executes the program 7061 to execute the data transmission method of the embodiments of the disclosure for a receiver device side. For simplicity, no more elaborations will be made herein.

Figure 8:
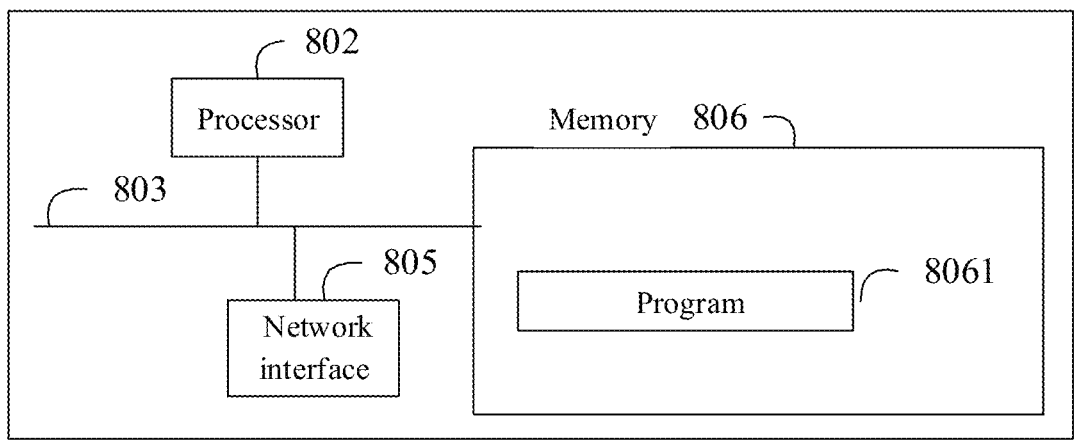
FIG. 8 is a structure diagram of a sender device according to another embodiment of the disclosure.

FIG. 8 is a device structure of a sender device according to another embodiment of the disclosure. The structure includes at least one processor 802 (for example, CPU), at least one network interface 805 or other communication interface, a memory 806 and at least one communication bus 803 configured to implement connection communication between these devices. The processor 802 is configured to execute an executable module, for example, a computer program, stored in the memory 806. The memory 806 may include a high-speed RAM and may also include a non-volatile memory, for example, at least one disk memory. A communication connection with at least one other network element is implemented through the at least one network interface 805 (which may be wired or wireless).

In some implementation modes, the memory 806 stores a program 8061 and the processor 802 executes the program 8061 to execute the data transmission method of the embodiments of the disclosure for a sender device side. For simplicity, no more elaborations will be made herein.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, comprising:
   receiving, by a device, a first code block part and at least one second code block part of a transport block on a time unit, a first modulation and coding processing being adopted for the first code block part and a second modulation and coding processing being adopted for the at least one second code block part, wherein the first code block part comprises multiple code sub-blocks, each of which is independently coded, and the second code block part comprises at least one code sub-block, each of which is independently coded, a number of time units occupied by the first code block part is greater than a number of time units occupied by the at least one second code block part; and
   demodulating, by the device, the first code block part and the at least one second code block part,
   wherein the device is a terminal device and the method further comprises:
   sending, by the terminal device, capability information to a network device, the capability information being configured to indicate that the terminal device supports the transport block transmitted on the time unit to be divided into the first code block part and the at least one second code block part for transmission,
   wherein the time it occupies N time-domain symbols, first L time-domain symbols of the N time-domain symbols are used for transmitting the first code block art and last K time-domain symbols of the N time-domain symbols are used for transmitting the at least one second code block part, N being a positive integer greater than 1, L being a positive integer not greater than N and K being a positive integer not greater than N wherein the method further comprises: receiving, by the terminal device, a second signaling, sent by the network device,
   wherein, the second signaling indicates a number of resource elements (REs) occupied by the at least one second code block part or indicates a ratio of the number of the REs occupied by the at least one second code block part to a total number of REs and the terminal device acquires a K according to information about the number of the REs.

2. The method of claim 1, further comprising:
   receiving, by the terminal device, a notification message sent by the network device, the notification message being configured to determine a code block size of the first code block part and a code block size of the at least one second code block part.

3. The method of claim 2, wherein the notification message includes a transport block size of the transport block, and the method further comprises:
determining a transport block size of the first code block part and a transport block size of the at least one second code block part according to the transport block size of the transport block, which is sent by the network device, and the preset rule.

4. The method of claim 3, wherein the preset rule indicates a magnitude relationship among the transport block size of the transport block, the transport block size of the first code block part and the transport block size of the at least one second code block part.

5. The method of claim 1, wherein a sum of the L time-domain symbols occupied by the first code block part and the K time-domain symbols occupied by the at least one second code block part is the N time-domain symbols occupied by the time unit;
or L+K=N+1, a last time-domain symbol in the L time-domain symbols and a first time-domain symbol in the K time-domain symbols being the same time-domain symbol.

6. The method of claim 1, wherein the second signaling is configured to determine the first code block part and the at least one second code block part.

7. The method of claim 1, wherein a resource mapping manner for the at least one second code block part is a manner of a frequency domain at first and then a time domain.

8. A device, comprising:
a receiver, configured to receive a first code block part and at least one second code block part of a transport block on a time unit, first modulation and coding processing being adopted for the first code block part and second modulation and coding processing being adopted for the at least one second code block part, wherein the first code block part comprises multiple code sub-blocks, each of which is independently coded, and the second code block part comprises at least one code sub-block, each of which independently coded, a number of time units occupied by the first code block part is greater than a number of time units occupied by the at least one second code block part;
a processor, configured to demodulate the first code block part and the at least one second code block part; and
a transmitter, configured to send capability information to a network device, the capability information being configured to indicate that the device supports the transport block transmitted on the time unit to be divided into the first code block part and the at least one second code block part for transmission,
wherein the time unit occupies N time-domain symbols, first L time-domain symbols of the N time-domain symbols are used for transmitting the first code block part and last K time-domain symbols of the N time-domain symbols are used for transmitting the at least one second code block part, N being a positive integer greater than 1, L being a positive integer not greater than N and K being a positive integer not greater than N wherein the receiver is further configured to receive a second signaling, sent by the network device,
wherein the second signaling indicates a number pf resource elements (REs) occupied by the at least one second code block part or indicates a ratio of the number of the REs occupied by the at least one second code block part to a total number of REs, and the device acquires a value of K according to information about the number of the REs.

9. The device of claim 8, wherein the receiver is further configured to:
receive a notification message sent by the network device, the notification message being configured to determine a code block size of the first code block part and a code block size of the at least one second code block part.

10. The device of claim 9, wherein the notification message includes a transport block size of the transport block, and the method further comprises:
determining a transport block size of the first code block part and a transport block size of the at least one second code block part according to the transport block size of the transport block, which is sent by the network device, and the preset rule.

11. The device of claim 10, wherein the preset rule indicates a magnitude relationship among the transport block size of the transport block, the transport block size of the first code block part and the transport block size of the at least one second code block part.

12. The device of claim 8, wherein a sum of the L time-domain symbols occupied by the first code block part and the K time-domain symbols occupied by the at least one second code block part is the N time-domain symbols occupied by the time unit; or
L+K=N+1, a last time-domain symbol in the L time-domain symbols and a first time-domain symbol in the K time-domain symbols being the same time-domain symbol.

13. The device of claim 8, wherein configured to:
the second signaling is configured to determine the first code block part and the at least one second code block part.

14. The device of claim 8, wherein a resource mapping manner for the at least one second code block part is a manner of a frequency domain at first and then a time domain.

* * * * *